(12) United States Patent
Zimmerman et al.

(10) Patent No.: US 11,498,168 B2
(45) Date of Patent: Nov. 15, 2022

(54) PALLET AUTOMATIC CHANGEOVER SYSTEM AND METHOD

(71) Applicant: HONDA MOTOR CO., LTD., Tokyo (JP)

(72) Inventors: Daniel J. Zimmerman, Dublin, OH (US); Thomas P. Kaminski, Jr., Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 17/002,364

(22) Filed: Aug. 25, 2020

(65) Prior Publication Data
US 2022/0063032 A1    Mar. 3, 2022

(51) Int. Cl.
*B23P 19/12*    (2006.01)
*B65G 35/06*    (2006.01)
(Continued)

(52) U.S. Cl.
CPC .......... *B23P 19/12* (2013.01); *B65D 19/0093* (2013.01); *B65G 35/06* (2013.01); *B23P 2700/50* (2013.01); *B62D 65/022* (2013.01); *B65D 2519/00273* (2013.01); *B65D 2519/00766* (2013.01); *B65D 2519/00815* (2013.01); *B65G 2201/0267* (2013.01);
(Continued)

(58) Field of Classification Search
CPC ................ B65G 35/06; B65G 47/8815; B65G 2201/0267; B65G 2203/04; B65G 2203/044; B65G 2205/04; B65D 19/0093; B65D 2519/00273; B65D 2519/00766; B65D 2519/00815; B62D 65/022; B23P 19/12; B23P 2700/50
See application file for complete search history.

(56) References Cited

U.S. PATENT DOCUMENTS 4,915,033 A * 4/1990 Bond ..................... B65D 19/44
                                                        108/55.1
4,977,836 A * 12/1990 Bond ..................... B65D 19/44
                                                        248/346.02
(Continued)

FOREIGN PATENT DOCUMENTS

CN    206084457 U    4/2017
CN    105417199 B    8/2017
(Continued)

*Primary Examiner* — Gene O Crawford
*Assistant Examiner* — Keith R Campbell
(74) *Attorney, Agent, or Firm* — ArentFox Schiff LLP

(57) ABSTRACT

A system and method can change location pins on a pallet for an assembly line. The system may include a plurality of pallets, each pallet including at least a first and second sockets configured to receive a location pin. The system may include a pin changing unit located between a top assembly line and a lower return line. The pin changing unit may include a pin grabber configured to engage the location pin within the first socket. The pin changing unit may include a horizontal linear actuator configured to move the pin grabber and the engaged location pin into alignment with the second socket. The pin changing unit may include a vertical linear actuator configured to extend the pin grabber into engagement with the location pin and retract the pin grabber away from the location pin.

20 Claims, 8 Drawing Sheets

(51) Int. Cl.
 B65D 19/00 (2006.01)
 *B62D 65/02* (2006.01)
(52) U.S. Cl.
 CPC .. *B65G 2203/0266* (2013.01); *B65G 2203/04* (2013.01); *B65G 2203/044* (2013.01); *B65G 2205/04* (2013.01)

(56) References Cited

U.S. PATENT DOCUMENTS

| | | | | | |
|---|---|---|---|---|---|
| 5,080,023 | A | * | 1/1992 | Miura | B65D 19/44 108/55.3 |
| 5,404,821 | A | * | 4/1995 | Bond | B65D 19/44 108/55.1 |
| 5,465,827 | A | * | 11/1995 | Nakagawa | B65G 35/06 104/168 |
| 5,809,906 | A | * | 9/1998 | Janek | B65D 19/385 108/143 |
| 7,044,066 | B1 | * | 5/2006 | Miller | B65D 19/44 108/55.3 |
| 10,189,601 | B2 | * | 1/2019 | Grutt | B65D 19/40 |
| 2014/0026379 | A1 | | 1/2014 | Herzog et al. | |

FOREIGN PATENT DOCUMENTS

| | | | |
|---|---|---|---|
| JP | 3678263 | B2 | 8/2005 |
| KR | 1996-0012700 | B1 | 9/1996 |
| KR | 10-1907097 | B1 | 10/2018 |

* cited by examiner

PALLET AUTOMATIC CHANGEOVER SYSTEM AND METHOD

TECHNICAL FIELD

The present disclosure relates to assembly lines, and more particularly to changeover of pallets within an assembly line.

BACKGROUND

Various components may be assembled along an assembly line. A pallet may be used to position a component while various processes are performed on the component along the assembly line. When a product or component being manufactured changes (e.g., a change in model), the assembly line may be repurposed for a new component. A configuration of the pallet may change to accommodate the new component.

The time period for changing over the assembly line, including time to reconfigure the pallets, may be considered downtime for the assembly line. In some assembly lines, the component is placed on the pallet at the start of the assembly line and remains on the pallet until the end of the assembly line. Since the component is on the pallet, the configuration of the pallet cannot be changed. One solution is to run empty pallets through the assembly line and have a worker manually change the configuration of each of the empty pallets. This solution, however, may incur significant downtime for the assembly line.

In view of the foregoing, there is a need for improved techniques for pallet changeover in an assembly line. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a system for changing location pins on a pallet for an assembly line. The system may include a plurality of pallets, each pallet including at least a first socket configured to receive a location pin and a second socket configured to receive the location pin. The system may include a pin changing unit located between a top assembly line and a lower return line. The pin changing unit may include a pin grabber configured to engage the location pin within the first socket, the pin grabber comprising a hexagonal head configured to engage and rotate a hexagonal socket of the location pin. The pin changing unit may include a horizontal linear actuator configured to move the pin grabber and the engaged location pin into alignment with the second socket. The pin changing unit may include a vertical linear actuator configured to extend the pin grabber into engagement with the location pin and retract the pin grabber away from the location pin.

In another aspect, the disclosure provides a method of changing location pins on a pallet for an assembly line. The method may include receiving the pallet at a pin changing unit located on a return line of the assembly line. The method may include extending an alignment rod through an alignment opening of the pallet to align the pallet with the pin changing unit. The method may include determining a target pin location for the pallet based on a part to be received on the pallet. The method may include determining, via an optical sensor, whether the pallet includes a location pin at the target pin location. The method may include retracting the alignment rod to release the pallet from the pin changing unit in response to determining that the pallet includes the location pin at the pin location.

In another aspect, the disclosure provides an apparatus for changing location pins on a pallet for an assembly line. The apparatus may include a pin grabber configured to engage a location pin within a first socket, the pin grabber comprising a hexagonal head configured to engage and rotate a hexagonal socket of the location pin. The apparatus may include a horizontal linear actuator configured to move the pin grabber and the engaged location pin into alignment with a second socket. The apparatus may include a vertical linear actuator configured to extend the pin grabber into engagement with the location pin and retract the pin grabber away from the location pin.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any moving vehicle that may be capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides a system for automatic changeover of location pins on a pallet for an assembly line. The system may be located on a return line of the assembly line, which may be below the working assembly line. The system may operate on a pallet while no component is present on the pallet. The working assembly line may continue to carry pallets with parts such that operation of the assembly line may continue uninterrupted.

Figure 1:
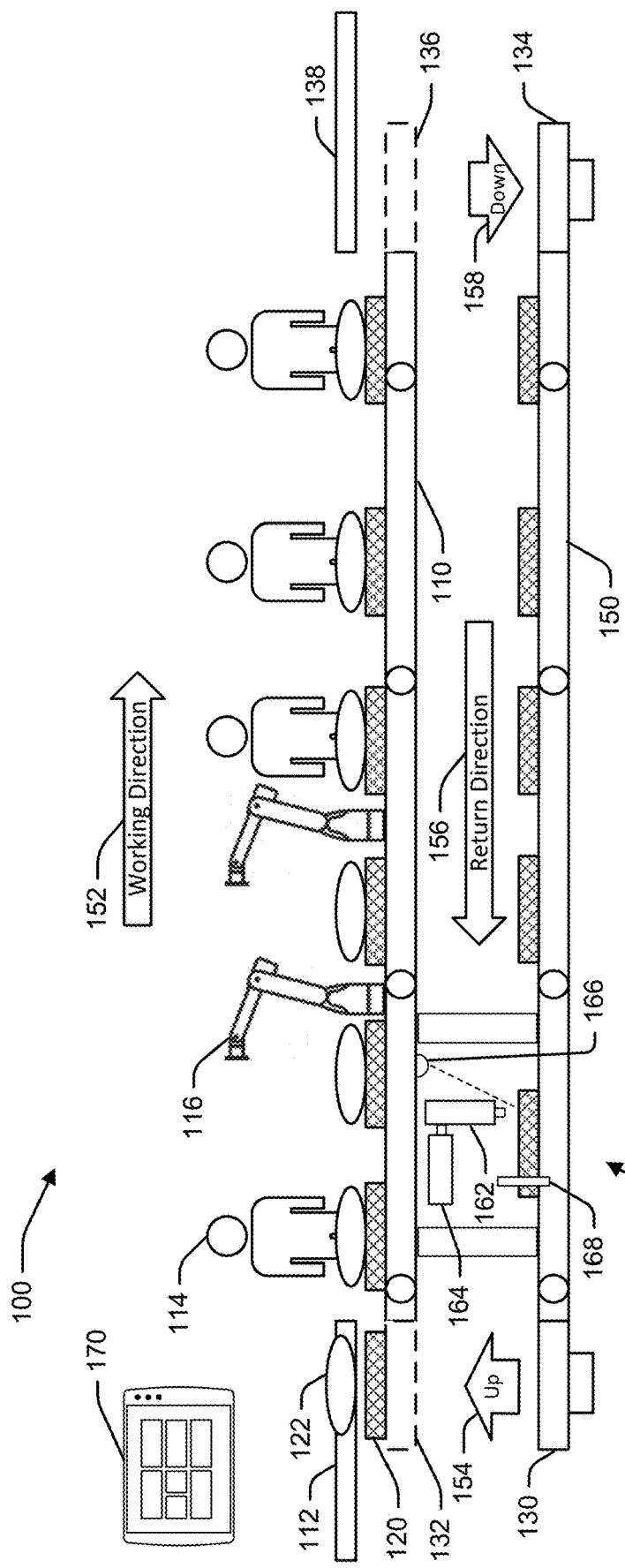
FIG. 1 is a schematic diagram showing an example assembly line including a pin changing unit according to an aspect of the disclosure.

Turning to FIG. 1, a conceptual diagram of an example assembly line 100 shows an example operating environment of a pin changing unit 160. The assembly line 100 includes a top working line 110 and a bottom return line 150. At a start of the top working line 110, a loader 112 loads a component 122 onto a pallet 120. As discussed in further detail below, the component 122 may be positioned on the pallet 120 with respect to location pins. The assembly line 100 may include an elevator 130 that raises the pallet 120 from the bottom return line 150 to a raised position 132 at the start of the top working line 110. The top working line 110 may advance the pallet 120 and component 122 in a working direction 152. Workers 114 and/or robots 116 may be positioned at stations along the top working line 110. The workers 114 and/or robots 116 may perform an operation on the component 122 at each station. At an end of the top working line 110, a part picker 138 may remove the component 122 from the pallet 120. An elevator 134 may move the pallet 120 from the end of the top working line 110 to a start of the return line 150. The return line 150 may move the pallets 120 in the return direction 156.

In an aspect, the pin changing unit 160 may be positioned along the return line 150. In an implementation, the pin changing unit 160 may be located adjacent to the elevator 130 such that the pin changing unit 160 may configure a pallet 120 before releasing the pallet 120 to the elevator 130 to receive the next component. The pin changing unit 160 may include a vertical actuator 162 that moves a pin grabber in a vertical direction to engage an location pin, remove the location pin from the pallet 120, and insert the location pin into the pallet 120. The pin changing unit 160 may include a horizontal actuator 164 to move the vertical actuator 162 between sockets of the pallet 120 while the location pin is removed from the pallet 120. The pin changing unit 160 may include a sensor 166 that senses whether an location pin is in a pallet socket (e.g., the correct pallet socket for a configuration). The pin changing unit 160 may include an alignment rod 168 that engages an opening in the pallet 120 to align the pallet 120 with the pin changing unit 160.

The assembly line 100 may include a controller 170. The controller 170 may control operation of the assembly line 100 including the pin changing unit 160. The controller 170 may include a user interface (e.g., a touch screen) that allows an operator to select a configuration of the assembly line 100 and/or pin changing unit 160. For example, the operator may select a type or model of part for the assembly line 100.

Figure 2:
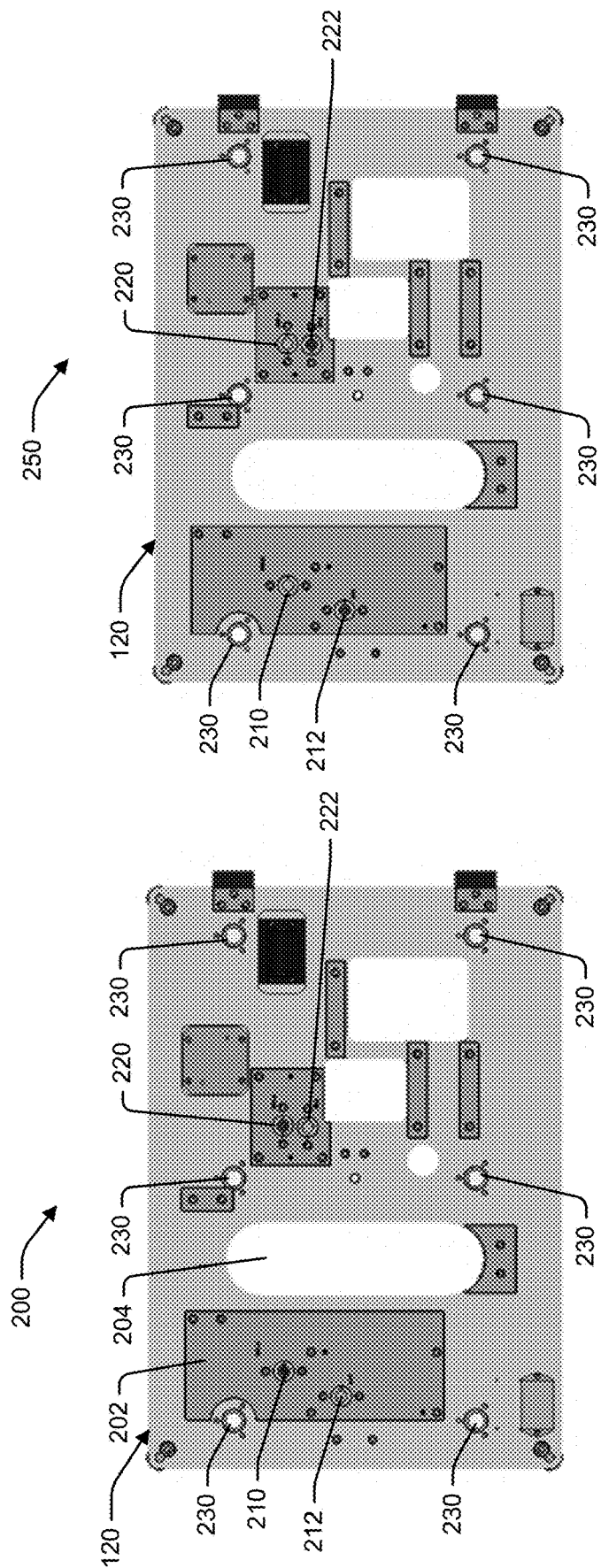
FIG. 2A is a top view of an example pallet in a first configuration according to an aspect of the disclosure.
FIG. 2B is a top view of the example pallet of FIG. 2A in a second configuration according to an aspect of the disclosure.

FIGS. 2A and 2B illustrate plan views of an example pallet 120. In FIG. 2A, the pallet 120 is in a first configuration 200 to receive a first component. In FIG. 2B, the pallet 120 is in a second configuration 250 to receive a second component. Generally, the pallet 120 is configured to align a component on the pallet 120 such that as the pallet travels along the top working line 110 of the assembly line 100, the component is aligned with the work stations. The pallet 120 may include one or more alignment openings 230 configured to receive an alignment rod 168 to align the pallet 120 with the pin changing unit 160 or a work station. The pallet 120 may include various raised surfaces 202 for supporting the component and various openings 204 to allow operations on the component. The pallet 120 may include a first socket 210 and a second socket 212. A location pin (FIG. 3: 300) may be inserted into either the first socket 210 or the second socket 212 to interface with a feature of the component. In one example, the component may be a fly wheel case that includes engine mounting holes. The location pin 300 may be received within the engine mounting holes to ensure alignment of the component with the pallet 120. In an aspect, the pallet 120 may include a third socket 220 and a fourth socket 222 that receive a second location pin that operates in a similar manner. The pallet 120 may include additional sockets based on the particular component.

The pallet 120 may accommodate different components based on the position of the location pins 300. For example, corresponding components for different vehicle models may have a similar shape, but different size. The assembly line 100 may include workers 114 and/or robots 116 that can perform operations on the different components. Accordingly, by moving the location pins 300 to reconfigure the pallet 120, the assembly line 100 may be used for different components. For instance, in the first configuration 200, the location pins 300 may be located in the first socket 210 and the third socket 220. The pin changing unit 160 may move the location pins 300 to the second socket 212 and the fourth socket 222.

Figure 3:
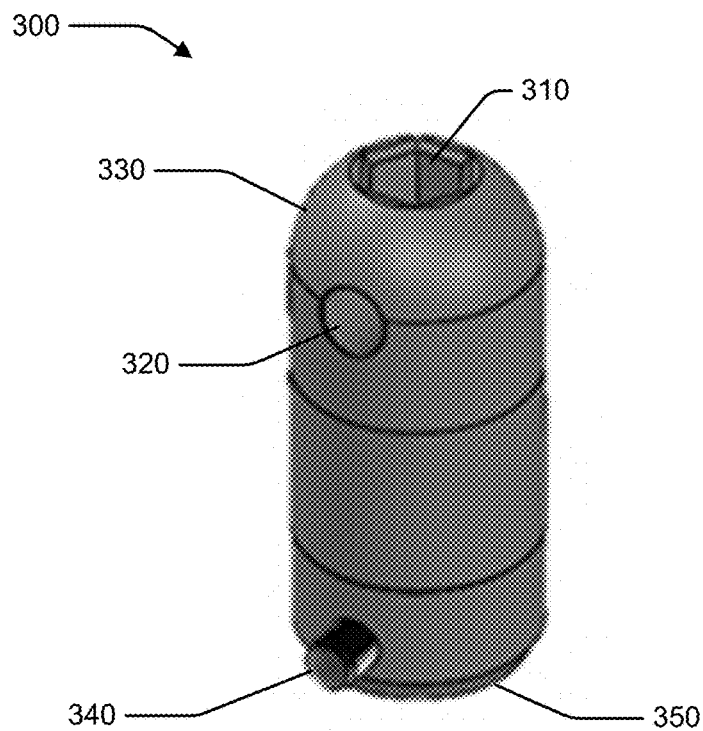
FIG. 3 is a perspective view of an example location pin according to an aspect of the disclosure.

FIG. 3 is a perspective view of an example location pin 300. The example location pin 300 may have a generally cylindrical shape. The location pin 300 may include a socket 310 at a top end. The socket 310 may be, for example, a hexagonal socket formed by the interior walls of the location pin 300. The socket 310 may receive a hexagonal driver (e.g., an Allen key). The location pin 300 may include a horizontal opening 320. For example, the horizontal opening 320 may be a through hole that extends along a diameter of the location pin 300. Alternatively, the horizontal opening 320 may be an indentation. The location pin 300 may include a rounded top surface 330. The location pin 300 may include a horizontal protrusion 340. In an aspect, for example, the horizontal protrusion 340 may be formed by a shaft extending along a diameter of the location pin 300. The shaft may from a horizontal protrusion 340 on opposite sides of the location pin 300. The location pin 300 may include a curved bottom surface 350.

Figure 4:
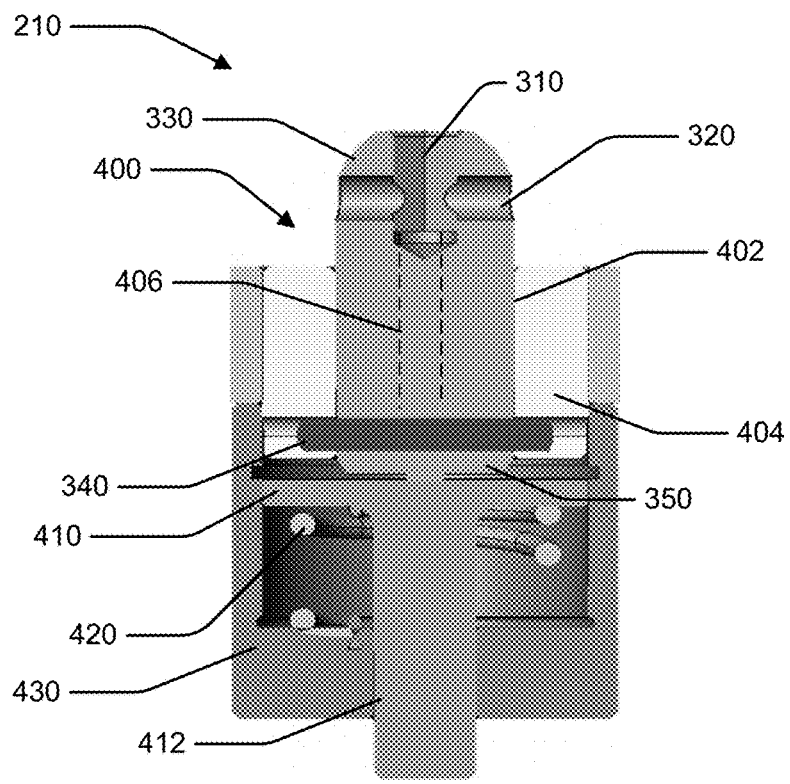
FIG. 4 is a cross-sectional view of an example location pin and example pallet socket according to an aspect of the disclosure.

FIG. 4 is a cross-sectional view of the example location pin 300 and example pallet socket 210. The location pin 300 may be inserted into and retained within the pallet socket 210. The pallet socket 210 may include a bushing 400 including an interior wall 402 that defines an opening for receiving the location pin 300. The interior wall 402 may include a pair of opposing vertical slots 406. When the protrusions 340 are aligned with the vertical slots 406, the location pin 300 may pass through the opening in the bushing 400. The bushing 400 may include a horizontal slot 404 along a bottom surface of the bushing. The horizontal slot 404 may be transverse (e.g., perpendicular) to the diameter between the opposing vertical slots 406. Once the protrusions 340 have cleared the bottom surface of the bushing 400, the location pin 300 may be rotated to align the protrusions 340 with the horizontal slot 404 to retain the protrusions 340. The pallet socket 210 may include a bottom plate 410 that is biased upward by a biasing element 420 (e.g., a spring). The pallet socket 210 may include a housing 430 that retains the bottom plate 410 and the biasing element 420. The bottom plate 410 may include a shaft that extends vertically through the housing 430.

Figure 5:
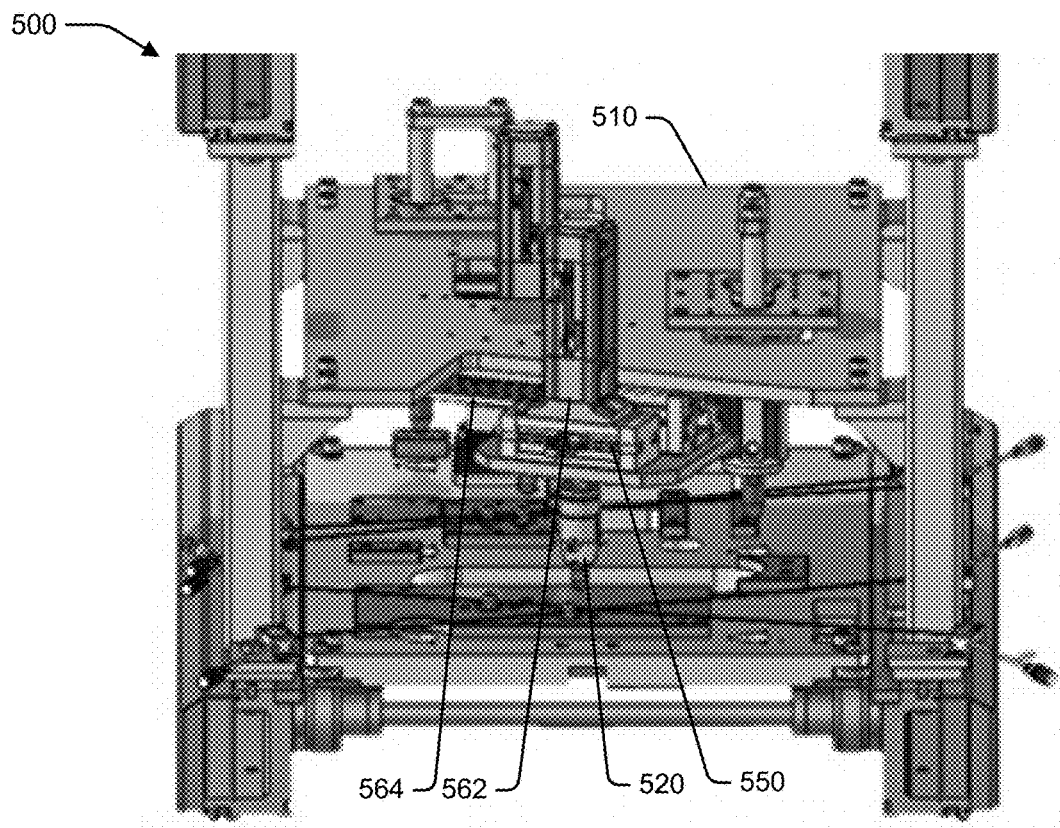
FIG. 5 is a perspective view of an example pin changing unit according to an aspect of the disclosure.

FIG. 5 is a front perspective view of an example pin changing unit 500. The pin changing unit 500 may be an example of the pin changing unit 160 that includes two pin grabbers 520. For example, the pin changing unit 160 may operate on the example pallet 120.

The pin changing unit 500 may include a plate 510 mounted to structural supports between the top working line 110 and the bottom return line 150. A horizontal actuator 564 may be mounted to the plate 510. The horizontal actuator 564 may be configured to translate the vertical actuator 562 between a first position (e.g., above socket 210) and a second position (e.g., above socket 212). The horizontal actuator 564 may be configured with mechanical stops to control the stopping locations of the vertical actuator 562. The vertical actuator 562 may raise and lower the pin grabber 520. The vertical actuator 562 may also include a rotational actuator 550 that rotates the pin grabber 520. For example, the rotational actuator may rotate the pin grabber 520 to rotate the protrusions 340 of a location pin 300 between alignment with the vertical slots 406 and the horizontal slot 404 (e.g., 90 degrees).

Figure 6:
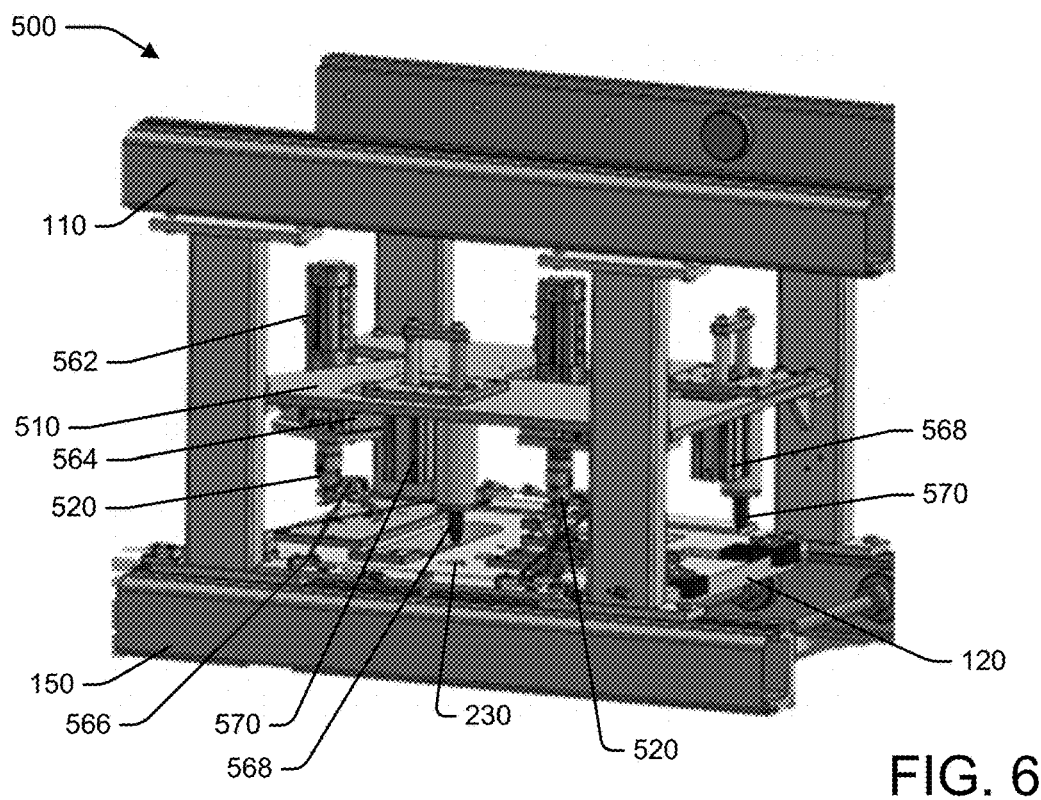
FIG. 6 is a cross-sectional view of an example pin grabber according to an aspect of the disclosure.

FIG. 6 is a side perspective view of the pin changing unit 500. The pin changing unit 500 may also include a vertical actuator 570 that raises and lowers the alignment rod 568 for engagement with an alignment opening 230 of the pallet 120. The alignment rod 568 may have a tapered shape to move the pallet 120 as the alignment rod 568 enters the alignment opening 230.

The pin changing unit 500 may also include one or more sensors 566. In an implementation, the sensors 566 may include lasers that are aimed through each potential position of a location pin. Accordingly, the sensors 566 may detect whether a location pin 300 is in a socket based on whether the laser beam is interrupted. In another implementation, the sensors 566 may include sensors and image recognition algorithms that detect whether a pin is located in the socket.

Figure 7:
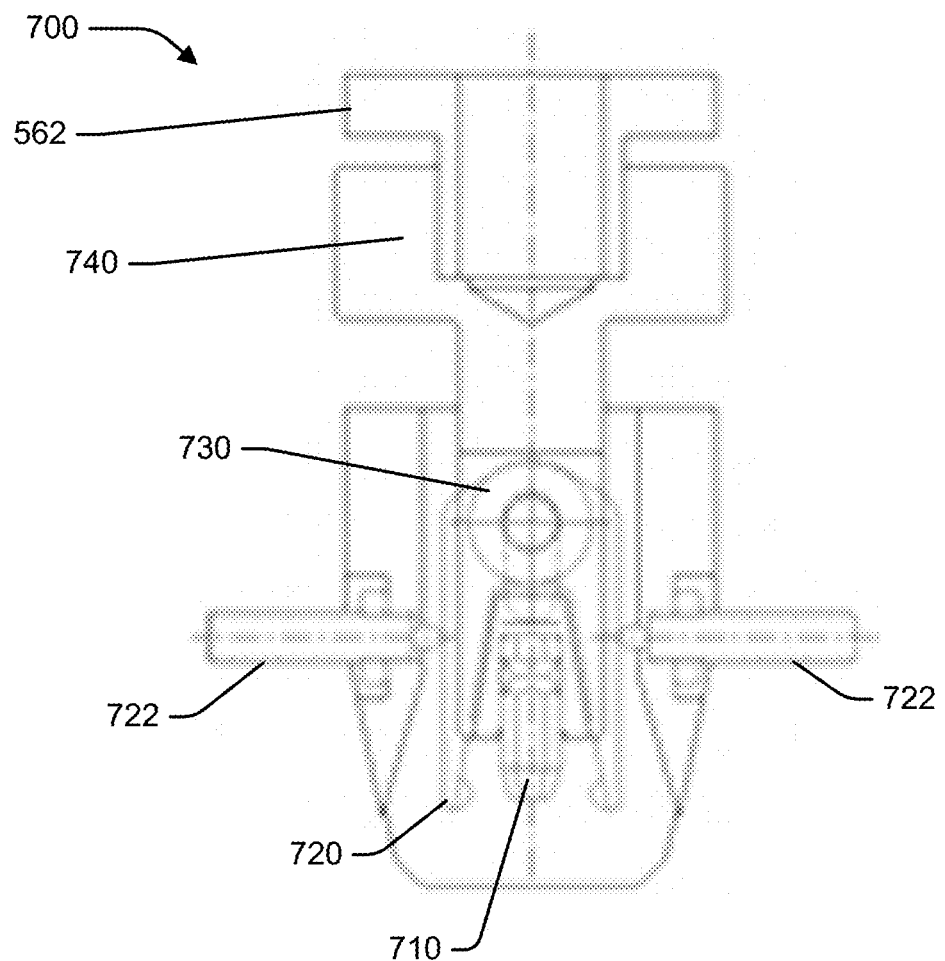
FIG. 7 illustrates operation of the example pin grabber of FIG. 6 according to an aspect of the disclosure.

FIG. 7 is a cross-sectional view of a first example pin grabber 700 according to an aspect of the disclosure. The pin grabber 700 may be an example of the pin grabber 520. The pin grabber 700 may connected to the vertical actuator 562 via a connector 740 (e.g., a threaded socket). The pin grabber 700 may include a head 710. The head 710 may be hexagonal to engage the hexagonal socket 310 of the location pin 300. The head 710 may also exert downward force on the location pin 300 to oppose the biasing element 420 and depress the bottom plate 410. The rotational actuator 550 may rotate the pin grabber 700 to turn the location pin 300. The pin grabber 700 may include a pair of opposing arms 720. The opposing arms 720 may include ends with rounded surfaces and inward protrusions. The opposing arms 720. The opposing arms 720 may be pivotably mounted above the head 710. The pin grabber 700 may include biasing members 722 that bias the opposing arms 720 inwardly. The opposing arms 720 may pivot outward as the ends slide along the rounded top surface 330. The protrusions may engage the horizontal openings 320. Accordingly, the pin grabber 700 may lift a location pin 300 out of a socket (e.g., socket 210).

Figure 8:
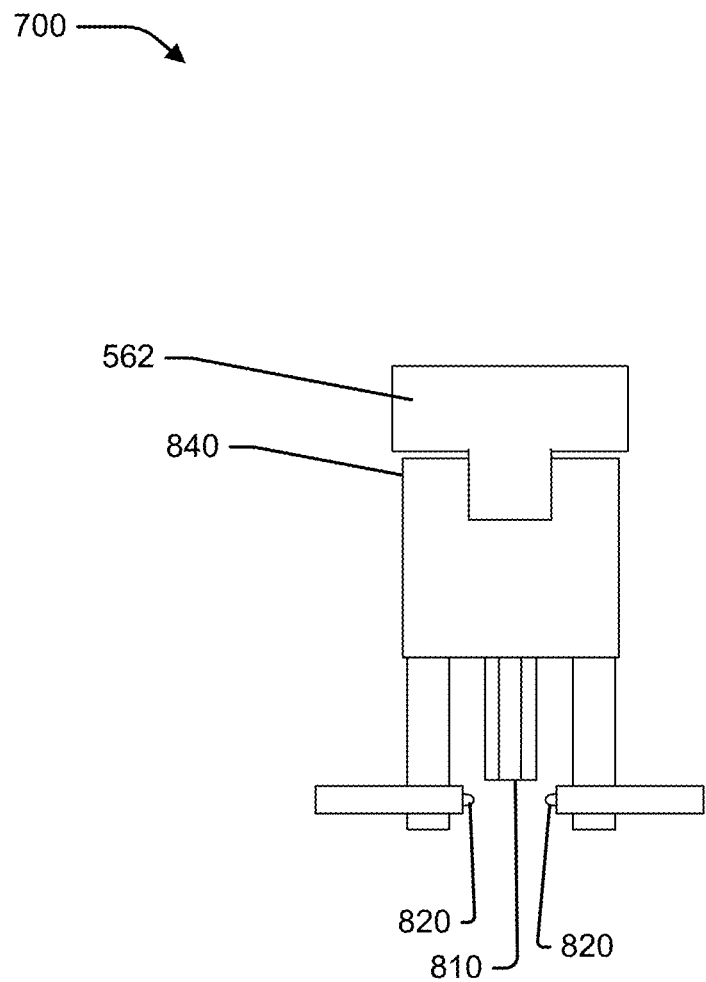
FIG. 8 illustrates a flowchart showing an example method of pallet changeover for an assembly line according to an aspect of the disclosure.

FIG. 8 is a cross-sectional view of a second example pin grabber 800 according to an aspect of the disclosure. The pin grabber 800 may be an example of the pin grabber 520. The pin grabber 800 may connected to the vertical actuator 562 via a connector 840 (e.g., a threaded socket). The pin grabber 800 may include a head 810. The head 810 may be hexagonal to engage the hexagonal socket 310 of the location pin 300. The head 810 may also exert downward force on the location pin 300 to oppose the biasing element 420 and depress the bottom plate 410. The rotational actuator 550 may rotate the pin grabber 800 to turn the location pin 300. The pin grabber 800 may include a pair of biased pins 820. The biased pins 820 may include curved ends and be biased inward (e.g., by a spring). The biased pins 820 may retract outward as the ends slide along the rounded top surface 330. The biased pins 820 may engage the horizontal openings 320. Accordingly, the pin grabber 800 may lift a location pin 300 out of a socket (e.g., socket 210).

Figure 9:
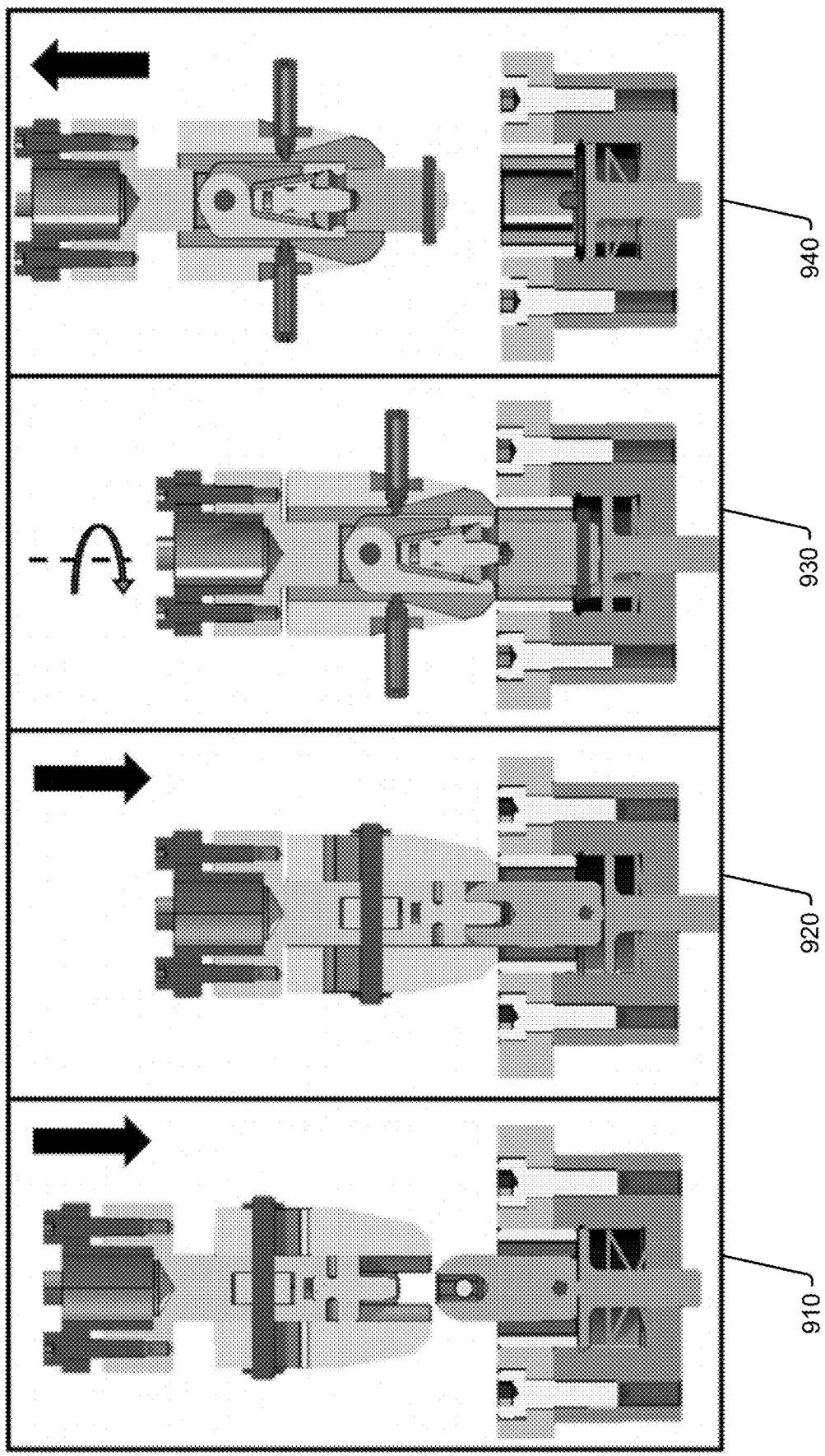
FIG. 9 presents a system diagram of various example hardware components and other features, for use in accordance with aspects of the present disclosure.

FIG. 9 illustrates operation of the example pin grabber 700. The pin grabber 700 may be moved via the vertical actuator 562 with no active control of the pin grabber 700. In block 910, the location pin 300 may be retained within the socket 210. The pin grabber 700 may be disengaged from the location pin 300. The arms 720 may be aligned with the horizontal openings 320. In block 920, the vertical actuator 562 may lower the pin grabber 700 onto the top of the location pin 300. The head 710 may engage the socket 310. The arms 720 may slide over the rounded top surface 330 to engage the horizontal openings 320. The bottom plate 410 may be depressed such that the protrusions 340 clear the horizontal slot 404. In block 920, the vertical actuator 562 and/or rotational actuator 550 may rotate the pin grabber 700 such that the protrusions 340 are aligned with the vertical slots 406. In block 940, the vertical actuator 562 may lift the pin grabber 700. The location pin 300 may remain engaged with the pin grabber 700 via the opposing arms 720. Accordingly, the location pin 300 may be lifted out of the socket 210.

A reverse operation may be used to position the location pin 300 in a socket (e.g., socket 212). When the pin grabber 700 is lifted with the protrusions 340 retained within the horizontal slot 404, the opposing arms 720 may disengage from the horizontal openings 320.

Figure 10:
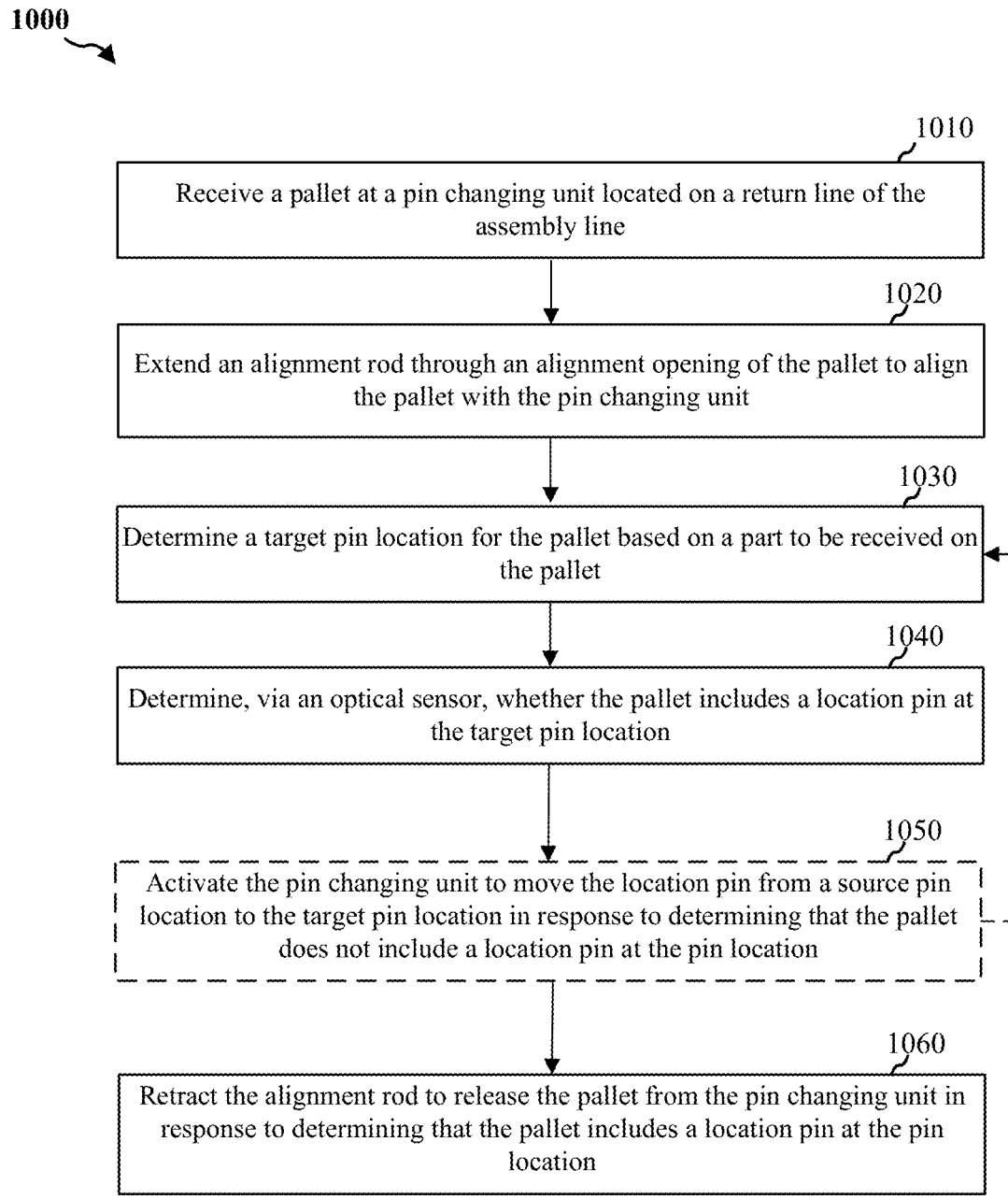
FIG. 10 is a block diagram of various example system components, for use in accordance with aspects of the present disclosure.

FIG. 10 illustrates a flowchart showing an example of a method 1000 for configuring a pallet for an assembly line. The method 1000 may be performed by the controller 170 for controlling the pin changing unit 160 or the pin changing unit 500.

At block 1010, the method 1000 may include receiving the pallet at a pin changing unit located on a return line of the assembly line. In an aspect, for example, the pin changing unit 160 or the pin changing unit 500 may receive a pallet 120 on the return line 150 of the assembly line 100. For instance, the return line 150 may move the pallet 120 into the pin changing unit 160 or the pin changing unit 500.

At block 1020, the method 1000 may include extending an alignment rod through an alignment opening of the pallet to align the pallet with the pin changing unit. In an aspect, for example, the controller 170 may control the pin changing unit 160 or the pin changing unit 500 to extend the alignment rod 168 or alignment rod 568 through the alignment opening 230 of the pallet 120 to align the pallet with the pin changing unit 160 or the pin changing unit 500. The controller 170 may extend multiple alignment rods 168 or 568.

At block 1030, the method 1000 may include determining a target pin location for the pallet based on a part to be received on the pallet. In an aspect, for example, the controller 170 may determine the target pin location (e.g., socket 212) for the pallet 120 based on a part to be received on the pallet 120. In an implementation, the part may be a type of part for a current configuration of the assembly line 100, which may be selected via an interface of the controller 170. That is, the controller 170 may specify the same part and the same target pin location for each pallet 120 depending on the selected assembly line configuration. In an other implementation, the part may be a specific part for a corresponding pallet. For instance, an identifier of the part may be read from a tag associated with the part as the part approaches the loader 112. The controller 170 may specify the target pin location for the pallet 120 at the pin changing unit 160 that is about to receive the specific part.

At block 1040, the method 1000 may include determining, via an optical sensor, whether the pallet includes a location pin at the target pin location. In an aspect, for example, the sensor 166 or the sensor 566 may determine whether the pallet includes the location pin at the target pin location.

At block 1050, the method 1000 may optionally include activating the pin changing unit to move the location pin from a source pin location to the target pin location in response to determining that the pallet does not include a location pin at the target pin location. In an aspect, for example, the controller 170 may activate the pin changing unit 160 to move the location pin from the source pin location (e.g., socket 210) to the target pin location (e.g., socket 212) in response to determining that the pallet does not include the location pin 300 at the target pin location. In an implementation, the pin changing unit 160 may move the location pin as described above with respect to FIG. 9. For example, moving the location pin fro the source pin location to the target pin location may include: extending the pin grabber 520 into engagement with the location pin 300 at the source pin location; rotating the pin grabber 520 and location pin 300 between a first orientation and a second orientation; retracting the pin grabber 520 and location pin 300; controlling a horizontal actuator 164, 564 to move the pin grabber 520 to the target pin location; extending the pin grabber 520; rotating the pin grabber 520 and location pin 300 between the second orientation and the first orientation; and retracting the pin grabber 520 from the location pin 300. In an aspect, after moving the location pin, the method 1000 may return to block 1030 to move another location pin or return to block 1040 to check the position of the location pin. Alternatively, blocks 1030, 1040, and 1050 may be performed in parallel for each location pin. The method 1000 may proceed to block 1060 after moving the location pin.

At block 1060, the method 1000 may include retracting the alignment rod to release the pallet from the pin changing unit in response to determining that the pallet includes a location pin at the target pin location. In an aspect, for example, the controller 170 may retract the alignment rod 168, 568 to release the pallet 120 from the pin changing unit 160, 500 in response to determining that the pallet 120 includes the location pin 300 at the target pin location.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein with respect to the controller 170 and/or the sensors 166, 566. FIG. 11 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 1100 is shown in FIG. 11.

Computer system 1100 includes one or more processors, such as processor 1104. The processor 1104 is connected to a communication infrastructure 1106 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 1100 may include a display interface 1102 that forwards graphics, text, and other data from the communication infrastructure 1106 (or from a frame buffer not shown) for display on a display unit 1130. Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc., which is read by and written to removable storage drive 1114. As will be appreciated, the removable storage unit 1118 includes a computer usable storage medium having stored therein computer software and/or data.

In alternative aspects, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1114, a hard disk installed in hard disk drive 1112, and signals 1128. These computer program products provide software to the computer system 1100. Aspects of the disclosure are directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform various features in accordance with aspects of the present disclosure, as discussed herein. In particular, the computer programs, when executed, enable the processor 1104 to perform such features. Accordingly, such computer programs represent controllers of the computer system 1100.

In variations where aspects of the disclosure are implemented using software, the software may be stored in a computer program product and loaded into computer system 1100 using removable storage drive 1114, hard disk drive 1112, or communications interface 1124. The control logic (software), when executed by the processor 1104, causes the processor 1104 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s). In yet another example variation, aspects of the disclosure are implemented using a combination of both hardware and software.

FIG. 12 is a block diagram of various example system components that may be used in accordance with aspects of the present disclosure. For example, the various components may be within the assembly line 100, or only some of the components may be within the assembly line 100 (e.g., controller 170), and other components may be remote from the assembly line 100. The system 1200 includes one or more accessors 1260, 1262 (also referred to interchangeably herein as one or more "users") and one or more terminals 1242, 1266 (such terminals may be or include, for example, the controller 170). In one aspect, data for use in accordance with aspects of the present disclosure is, for example, input and/or accessed by accessors 1260, 1262 via terminals 1242, 1266, such as personal computers (PCs), minicomputers, mainframe computers, microcomputers, telephonic devices, or wireless devices, such as personal digital assistants ("PDAs") or a hand-held wireless devices coupled to a server 1243, such as a PC, minicomputer, mainframe computer, microcomputer, or other device having a processor and a repository for data and/or connection to a repository for data, via, for example, a network 1244, such as the Internet or an intranet, and couplings 1245, 1246, 1264. The couplings 1245, 1246, 1264 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for changing location pins on a pallet for an assembly line, comprising:
   a plurality of pallets, each of the pallets including at least a first socket configured to receive a location pin and a second socket configured to receive the location pin; and
   a pin changing unit located between a top assembly line and a lower return line, the pin changing unit comprising:
      a pin grabber configured to engage the location pin within the first socket, the pin grabber comprising a hexagonal head configured to engage and rotate a hexagonal socket of the location pin;
      a horizontal linear actuator configured to move the pin grabber and the engaged location pin into alignment with the second socket; and
      a vertical linear actuator configured to extend the pin grabber into engagement with the location pin and retract the pin grabber away from the location pin.

2. The system of claim 1, further comprising a sensor configured to activate the pin changing unit in response to determining that the location pin is within the first socket of a current pallet of the pallets.

3. The system of claim 2, wherein the sensor is configured to signal the system to release the current pallet in response to determining that the location pin is within the second socket of the current pallet.

4. The system of claim 1, further comprising a pallet stopper configured to stop the pallet at the pin changing unit, wherein the pallet stopper comprises an alignment rod that engages an opening in the pallet to align the pallet with the pin changing unit.

5. The system of claim 1, further comprising a controller configured to:
   receive an indication of a part model for a queued part; and
   select the first socket and the second socket based on the part model for the pallet corresponding to the queued part.

6. The system of claim 5, further comprising a loader configured to load the queued part onto the pallet with the location pin engaging an opening of the queued part.

7. The system of claim 1, wherein the pin grabber is configured to engage one or more indentations located on sides of the location pin.

8. The system of claim 7, wherein the pin grabber is configured to lift the location pin while engaged with the one or more indentations.

9. The system of claim 1, wherein the pin changing unit further includes a rotational actuator configured to rotate the pin grabber.

10. The system of claim 9, wherein the location pin includes opposing protrusions and the first socket and the second socket each include a pair of opposing vertical slots and a transverse horizontal slot, wherein the rotational actuator is configured to rotate between a first position with the opposing protrusions aligned with the pair of opposing vertical slots and a second position with the opposing protrusions aligned with the transverse horizontal slot.

11. A method of changing location pins on a pallet for an assembly line, comprising:
   receiving the pallet at a pin changing unit located on a return line of the assembly line;
   extending an alignment rod through an alignment opening of the pallet to align the pallet with the pin changing unit;
   determining a target pin location for the pallet based on a part to be received on the pallet;
   determining, via an optical sensor, whether the pallet includes a location pin at the target pin location; and
   retracting the alignment rod to release the pallet from the pin changing unit in response to determining that the pallet includes the location pin at the pin location.

12. The method of claim 11, further comprising activating the pin changing unit to move the location pin from a source pin location to the target pin location in response to determining that the pallet does not include the location pin at the target pin location.

13. The method of claim 12, wherein activating the pin changing unit to move the location pin comprises:
   extending a pin grabber into engagement with the location pin at the source pin location;
   rotating the pin grabber and the location pin between a first orientation and a second orientation;
   retracting the pin grabber and the location pin;
   controlling a horizontal actuator to move the pin grabber to the target pin location;
   extending the pin grabber;
   rotating the pin grabber and the location pin between the second orientation and the first orientation; and
   retracting the pin grabber from the location pin.

14. The method of claim 13, wherein the pin grabber is configured to engage one or more indentations located on sides of the location pin.

15. The method of claim 14, wherein the pin grabber is engaged with the one or more indentations when retracting the pin grabber and the location pin.

16. The method of claim 13, wherein the location pin includes opposing protrusions, wherein a first socket at the source pin location and a second socket at the target pin location each include a pair of opposing vertical slots and a transverse horizontal slot, and wherein in the first orientation the the opposing protrusions are aligned with the transverse horizontal slot and in the second orientation the opposing protrusions are aligned with the pair of opposing vertical slots.

17. The method of claim 11, further comprising loading the part onto the pallet with the location pin engaging a surface defining an opening of the part.

18. An apparatus for changing location pins on a pallet for an assembly line, comprising:
   a pin grabber configured to engage a location pin within a first socket, the pin grabber comprising a hexagonal head configured to engage and rotate a hexagonal socket of the location pin;
   a horizontal linear actuator configured to move the pin grabber and the engaged location pin into alignment with a second socket; and
   a vertical linear actuator configured to extend the pin grabber into engagement with the location pin and retract the pin grabber away from the location pin.

19. The apparatus of claim 18, further comprising a sensor configured to:
   determine that the location pin is within the first socket of a current pallet;
   activate the apparatus to move the location pin from the first socket to the second socket; and
   release the current pallet in response to determining that the location pin is within the second socket of the current pallet.

20. The apparatus of claim 18, further comprising a pallet stopper configured to stop the pallet at the apparatus, wherein the pallet stopper comprises an alignment rod that engages an opening in the pallet to align the pallet with the apparatus.

* * * * *